US011172369B2

United States Patent
Ergen (10) Patent No.: US 11,172,369 B2
(45) Date of Patent: Nov. 9, 2021

(54) METHOD AND SYSTEM FOR ENHANCING SIGNAL QUALITIES WITHIN A WI-FI NETWORK USING AN ADAPTIVE-SOFTWARE DEFINED NETWORK (A-SDN)

(71) Applicant: Ambeent Wireless, Istanbul (TR)

(72) Inventor: Mustafa Ergen, Istanbul (TR)

(73) Assignee: AMBEENT WIRELESS, Istanbul (TR)

(*) Notice: Subject to any disclaimer, the term of this patent is extended or adjusted under 35 U.S.C. 154(b) by 33 days.

(21) Appl. No.: 16/821,528

(22) Filed: Mar. 17, 2020

(65) Prior Publication Data

US 2021/0297866 A1    Sep. 23, 2021

(51) Int. Cl.

| | | |
|---|---|---|
| *H04W 16/10* | (2009.01) | |
| *H04W 24/10* | (2009.01) | |
| *H04W 72/08* | (2009.01) | |
| *H04W 88/08* | (2009.01) | |
| *H04B 17/318* | (2015.01) | |
| *H04W 4/02* | (2018.01) | |
| *H04L 29/12* | (2006.01) | |
| *H04L 12/715* | (2013.01) | |

(Continued)

(52) U.S. Cl.
CPC .......... *H04W 16/10* (2013.01); *H04B 17/318* (2015.01); *H04L 45/306* (2013.01); *H04L 45/64* (2013.01); *H04L 61/6022* (2013.01); *H04W 4/023* (2013.01); *H04W 4/80* (2018.02); *H04W 24/10* (2013.01); *H04W 72/082* (2013.01); *H04W 88/08* (2013.01)

(58) Field of Classification Search
CPC ...... H04W 16/16; H04W 4/80; H04B 17/318; H04L 45/64; H04L 45/306
USPC ........................................................ 370/329
See application file for complete search history.

(56) References Cited

U.S. PATENT DOCUMENTS

| | | |
|---|---|---|
| 9,008,685 B1 | 4/2015 | Gold et al. |
| 2018/0102858 A1 | 4/2018 | Tiwari et al. |
| 2020/0084777 A1 | 3/2020 | Ergen |

(Continued)

OTHER PUBLICATIONS

International Search Report and Written Opinion of PCT Application No. PCT/US2021/022836, dated Jun. 11, 2021, 11 pages.

*Primary Examiner* — Congvan Tran
(74) *Attorney, Agent, or Firm* — Chip Law Group (57) ABSTRACT

The invention provides a method and system for enhancing signal qualities within a Wi-Fi network using an adaptive-software defined network (A-SDN) and a cloud platform. The Wi-Fi network includes client devices connected to a Wi-Fi access point and a plurality of nearby Wi-Fi access points to the one or more client devices. The method and system collects radio frequency (RF) measurements pertaining to each client device, the connected Wi-Fi access point, and the plurality of nearby Wi-Fi access points, and an Artificial Intelligence (AI) model is utilized to derive interference measurements based on the RF measurements. The AI model then derives configurations related to Wi-Fi network parameters associated with the connected Wi-Fi access point based on the RF measurements and the interference measurements by solving a complex optimization problem. The Wi-Fi network parameters are then updated based on the derived configurations.

18 Claims, 8 Drawing Sheets

(51) Int. Cl.
*H04L 12/725* (2013.01)
*H04W 4/80* (2018.01)

(56) References Cited

U.S. PATENT DOCUMENTS

| | | | |
|---|---|---|---|
| 2020/0104113 A1* | 4/2020 | Grill | H04W 72/1289 |
| 2020/0162354 A1* | 5/2020 | Drees | H04L 41/0645 |
| 2020/0266939 A1* | 8/2020 | Wang | H04L 1/0003 |
| 2020/0288327 A1* | 9/2020 | Tilli | H04W 36/165 |
| 2021/0051213 A1* | 2/2021 | Likar | H04L 43/04 |

* cited by examiner

METHOD AND SYSTEM FOR ENHANCING SIGNAL QUALITIES WITHIN A WI-FI NETWORK USING AN ADAPTIVE-SOFTWARE DEFINED NETWORK (A-SDN)

FIELD OF THE INVENTION

The invention generally relates to enhancing signal qualities/performance within a Wi-Fi network. More specifically, the invention relates to enhancing signal qualities/performance within a Wi-Fi network based on user-centric and interference measurements from nearby Wi-Fi access points and Wi-Fi capable devices in the Wi-Fi network, to provide higher throughput despite different characteristics of network elements and changing network conditions.

BACKGROUND OF THE INVENTION

Wi-Fi networks are formed using one or more Wi-Fi access points (APs) that support connections of multiple wireless devices to a wired connection for access to the Internet. Due to huge demand, enormous number of Wi-Fi APs are deployed in places such as, but not limited to, residential spaces, apartments, office buildings and public spaces and the Wi-Fi access points are densely concentrated around certain places with high data traffic.

Current Wi-Fi APs operate in an inefficient manner due to a decentralized decision-making structure and lack of adaptability in changing network topology due to mobility of stations (STAs), increased number of Wi-Fi devices such as, but not limited to, mobile phones, Wi-Fi based Internet of Things (IoT) devices, smart televisions (TVs) and the like, and AP density. Also, current Wi-Fi network architectures accessed by users suffer from reduced throughput due to the decentralized structure.

Further, recent Wi-Fi protocol addresses the higher data delivery rate per time primarily by increased modulation that is applicable to only high signal to noise ratios (SNRs). On the other hand, due to increased number of Wi-Fi devices and IoT, the APs are always exposed to external neighbor signals.

A typical criterion in wireless communication is the signal quality which is the ratio of the primary signal power and the interfering signal powers on a same transmission channel. The signal quality of wireless communication is determined as signal-to-interference-plus-noise ratio (SINR), which is applicable to both STAs and APs. Consider the equation, $$SINR_{STA} = \frac{RSSI_i}{\sum_{j=1}^{N} C \cdot RSSI_j} \quad (1)$$

where $RSSI_i$ is the received signal strength indicator from $i^{th}$ AP; $RSSI_j$ is the received signal strength indicator from $j^{th}$ AP; C is the interference coefficient as a function of transmission channels, $SINR_{STA}$ is the signal-to-interference-plus noise ratio for a particular STA. A higher SINR results in a higher-level modulation which in turn provides a higher data rate delivery per time.

In practice SINR is applicable to both STAs and APs, since an STA becomes the transmitter when uploading data. In such a complex set of interactions, the overall network quality is favored by increasing the SINRs for all individual network elements and for all transmission paths. Thus, the following RSSI matrix must be considered for the global optimization:

$$RSSI = \begin{bmatrix} RSSI_{AP-AP} & RSSI_{AP-STA} \\ RSSI_{STA-AP} & RSSI_{STA-STA} \end{bmatrix} \quad (2)$$

where $RSSI_{AP-AP}$ is the RSSI that APs receive from nearby APs; $RSSI_{AP-STA}$ is the RSSI that APs receive from nearby STAs; $RSSI_{STA-AP}$ is the RSSI that STAs receive from nearby APs; $RSSI_{STA-STA}$ is the RSSI that STAs receive from nearby STAs. In practice, whole RSSI matrix in Eq. 2 must be measured and used in the decision process since all network elements are both downloaders and uploaders depending on the direction of data flow. However, in practice, only a subset of RSSI matrix can be measured in real-time in a cost-effective manner. This in turn results in different applications in the Wi-Fi management.

Currently, most new APs have a channel scanning property. A scan is performed and a simplified channel assignment which takes $RSSI_{AP-AP}$ and the number of APs into account is performed. If a new channel assignment is needed, the APs must stop the transmission by taking the antenna into monitoring mode. Further repeating the process results in significant internet quality issues for STAs. In addition, the decision making does not take the SINRs of STAs for the high link speed.

An advantage of this application is that the APs do better considering Clear Channel Assessment (CCA) which evaluates the maximum interference level to start the transmission. However, this does not guarantee that the data will be transmitted to the STA, since its SINR is not included explicitly.

There are many drawbacks for the large-scale implementation in Wi-Fi networks. Firstly, old APs do not have a scanning mode and transmits on the factory-set channel unless the users take a manual action to change the channel. Secondly, there is no centralized solution. Thirdly, the solution is totally vendor dependent. The vendor must modify and update all APs and construct a cloud for the centralized computations. Combining the solution with other vendors is a challenging task and the integration is not cost-effective. Finally, even if the optimal channels are calculated in the cloud, there is no practical way to implement those on the APs.

Also, $RSSI_{AP-AP}$ and $RSSI_{AP-STA}$ are difficult to measure and upload to the cloud in real time. Since the STAs are highly mobile, the APs must scan constantly, which in turn results in interruption of transmission from the APs.

There is no practical way to measure $RSSI_{STA-STA}$. In theory, any STA which uploads a data packet causes interference to nearby APs and STAs. However, most STAs are downloaders and the interference impact is ignored mostly.

Furthermore, mobile devices, computers and some other Wi-Fi devices scan RF environment constantly to report probable Wi-Fi APs for connection from externally installed applications. The scan procedure covers the whole unlicensed spectrum which is divided into several channels based on country regulations. The more spectrum for the unlicensed band, the more potential for the high Wi-Fi link speed, as signal interference is caused by the transmission on the same or adjacent channels primarily.

Also, a radio frequency (RF) measurement module should be installed on the STAs or APs. Currently, mobile devices provide the scanning functionality from externally installed applications whereas the operating system is limited to rooted devices only. Also, all computer operating systems which scan and report RF environment's APs, determine the modulation for a particular data packet based on the RSSI from the STAs to which it is connected. Usually, the APs do not deliver or stream this to a cloud or any other software unless a specific software is installed on the AP. In addition, some APs scan their environment directly and report the delivered RSSI, eliminating the need of an STA for RF measurement.

Furthermore, a major concern to SDNs is to maximize the signal qualities within a Wi-Fi network to provide higher throughput despite different characteristics of network elements and changing network conditions. The primary manipulated variable in the process is changing the channels of the specified APs to more vacant channels. Some Wi-Fi capable devices such as, but not limited to, printers, IoT devices, and extenders, do not harm the primary AP although the devices broadcast beacons. Such Wi-Fi capable devices are not differentiable from an external AP to Wi-Fi scans since they have a MAC address and RSSI values as in the case of APs. On the other hand, once those Wi-Fi devices are considered as APs, SDNs change the channel of the primary AP to avoid interference from those devices, although there is no actual interference. Since those devices always use the channel of the primary AP, the channel update runs into an infinite cycle.

Also, in theory, RSSI value from an AP is used to calculate the distance between the AP and a STA with the path loss equation once the transmit power of the AP is known. On the other hand, the distance estimation is usually not so accurate since the signals are exposed to interference from the objects nearby. To cope with the complexity of distance estimation, modified path loss equations whose parameters are applicable to only a specific region are utilized, which hinder the estimation on global scale.

Furthermore, the signal quality is an important concern for the development and the application of SDNs, since it is a measure of data delivery rate per time and highly influenced from the location of the different rooms where STAs spend time. The number of rooms is an approximate but leading criterion for the SDN to calculate the frequency of the control actions to change the network parameters and to provide best service to overall STAs.

Therefore, in light of the above, there is a need for a method and system for enhancing signal qualities within a Wi-Fi network to provide higher throughput despite different characteristics of network elements and changing network conditions considering user-centric and interference measurements form nearby Wi-Fi access points and Wi-Fi capable devices. Further, there is a need for a method and system to effectively compute a number of rooms in a household considering measurements from nearby Wi-Fi access points and client devices.

BRIEF DESCRIPTION OF THE FIGURES

The accompanying figures with reference numerals refer to identical or functionally similar elements throughout separate views and which together with the detailed description below are incorporated in and form part of the specification, serve to further illustrate various embodiments and to explain various principles and advantages all in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to enhancing signal qualities within a Wi-Fi network based on user-centric and interference measurements from nearby Wi-Fi access points and Wi-Fi capable devices in the Wi-Fi network, to provide higher throughput despite different characteristics of network elements and changing network conditions.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for enhancing signal qualities within a Wi-Fi network using an adaptive-software defined network (A-SDN) and a cloud platform. The Wi-Fi network includes one or more client devices connected to a Wi-Fi access point and a plurality of nearby Wi-Fi access points to the one or more client devices. To start with, the method and system collects, via the cloud platform of the A-SDN, radio frequency (RF) measurements pertaining to each client device of the one or more client devices, the connected Wi-Fi access point, and the plurality of nearby access Wi-Fi access points to the one or more client devices. Subsequently, an Artificial Intelligence (AI) model in the cloud platform is utilized to derive interference measurements based on the RF measurements collected from the plurality of nearby Wi-Fi access points. Thereafter, the AI model derives configurations related to one or more Wi-Fi network parameters associated with the connected Wi-Fi access point based on the RF measurements and the interference measurements. The one or more Wi-Fi network parameters can be, but need not be limited to, a channel of the connected Wi-Fi access point. The AI model then utilizes the RF measurements and the interference measurements to maximize overall performance of the Wi-Fi network by solving a complex optimization problem. In an embodiment, the AI model detects one or more Wi-Fi capable devices in the Wi-Fi network based on the RF measurements and the interference measurements, to negate the interference measurements from the one or more Wi-Fi capable devices while deriving configurations related to the one or more Wi-Fi network parameters. The one or more Wi-Fi capable devices can be, but need not be limited to, a printer, an IoT device and an extender. Thereafter, the one or more Wi-Fi network parameters associated with the connected Wi-Fi access point are updated based on the derived configurations. In an instance, a channel of the connected Wi-Fi access point is updated based on the derived configurations.

Figure 1:
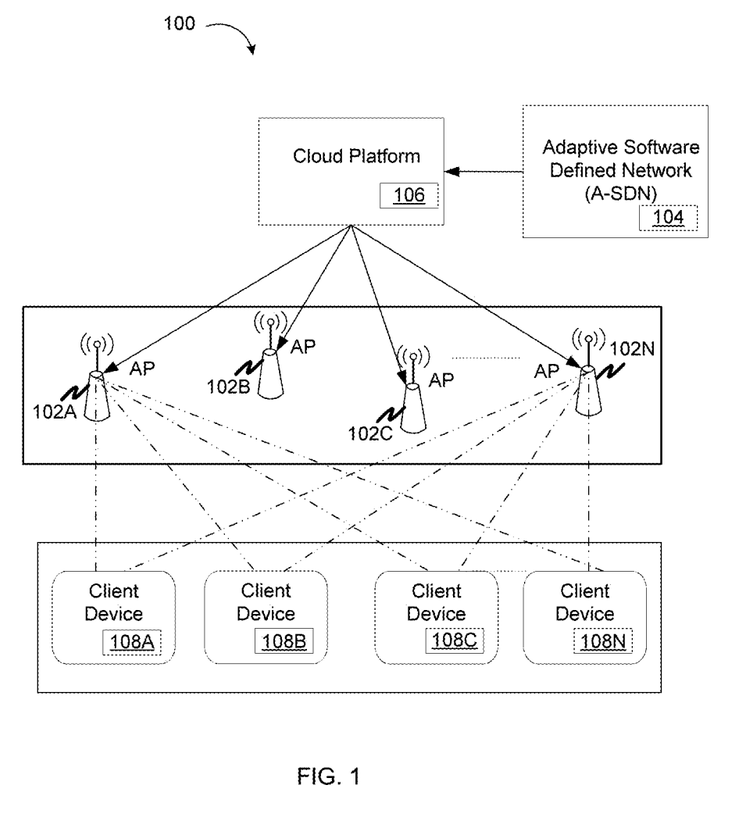
FIG. 1 illustrates a system for enhancing signal qualities within a Wi-Fi network using an adaptive software-defined network (A-SDN) in accordance with an embodiment of the invention.

FIG. 1 illustrates a system 100 for enhancing signal qualities within a Wi-Fi network using an A-SDN 104 and a cloud platform 106 in accordance with an embodiment of the invention.

As illustrated in FIG. 1, the Wi-Fi network includes a plurality of nearby Wi-Fi access points 102A-102N and a plurality of client devices 108A-108N, wherein one or more client devices of plurality of client devices 108A-108N are connected to a Wi-Fi access point 102A of plurality of nearby Wi-Fi access points 102A-102N.

Cloud platform 106 is communicatively coupled to plurality of nearby Wi-Fi access points 102A-102N, and plurality of client devices 108A-108N via A-SDN 104. Cloud platform 106 is further described in detail in conjunction with FIG. 2.

An infrastructure management function of A-SDN 104 further comprises Spectrum Broker (SB) function which is configured to obtain, optimize and automate spectrum resources. The SB function can be extended to Low Power Wide Area Networks (LPWANs) that use sub-GHz radio frequencies (typically 433 or 868 MHz) with typical transmission ranges in the order of 1 up to 50 kilometers. Notorious initiatives in this domain include, but are not limited to, Long Range (LoRa), Sigfox and the upcoming IEEE 802.11ah (or "HaLow") standard or NarrowBand-Internet of Things (NB-IoT) and 5G massive machine-type communications (mMTC). The SB function considers signal strengths and application specific parameters to manage the spectrum.

Figure 2:
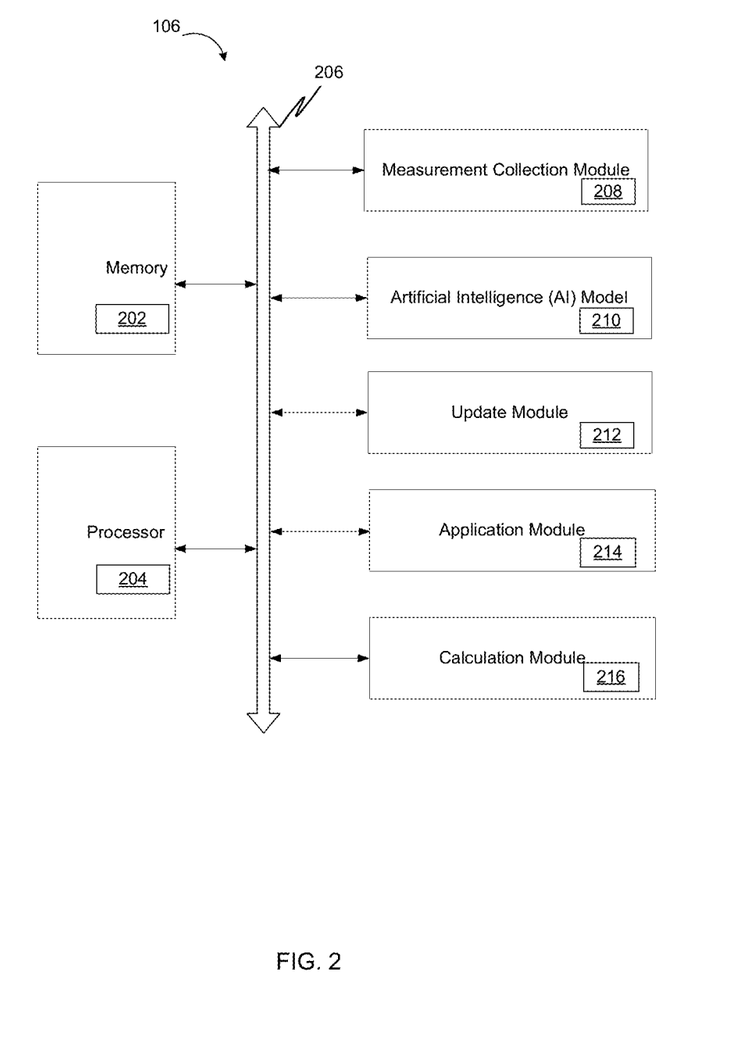
FIG. 2 illustrates various modules within the A-SDN for enhancing signal qualities within the Wi-Fi network in accordance with an embodiment of the invention.

FIG. 2 illustrates various modules in cloud platform 106 for enhancing signal qualities/performance within the Wi-Fi network using A-SDN 104 in accordance with an embodiment of the invention.

As illustrated in FIG. 2, cloud platform 106 includes a memory 202, and a processor 204 communicatively coupled to memory 202. Memory 202 and processor 204 further communicate with various modules of cloud platform 106 via a communication module 206.

Communication module 206 may be configured to transmit data between modules, engines, databases, memories, and other components of cloud platform for use in performing the functions discussed herein. Communication module 206 may include one or more communication types and utilizes various communication methods for communication within cloud platform 106.

Cloud platform 106 includes a measurement collection module 208 which collects RF measurements pertaining to each client device of the one or more client devices, connected Wi-Fi access point 102A, and plurality of nearby Wi-Fi access points 102A-102N to the one or more client devices.

Measurement collection module 208 has the capability to report plurality of nearby Wi-Fi access points 102A-102N, their channels and RSSIs to cloud platform 106 in a smart and efficient manner. To avoid excessive data generation, many filters and statistical monitoring methods are employed by measurement collection module 208 to determine an upload frequency from a client device. In addition, the frequency of the measurement by measurement collection module 208 can be changed remotely. Measurement collection module 208 can also perform speed tests to determine the backhaul when signal strength is high and the channel is optimum. Further, measurement collection module 208 also determines the 802.11 protocol of connected Wi-Fi access point 102 for efficient distribution of Wi-Fi resources. Measurement collection module 208 also runs in the background to report the current RF conditions and triggers the optimization when the conditions change. Such measurements do not increase the battery consumption of a client device significantly.

In an embodiment, the RF measurements pertaining to a client device 108A of plurality of client devices 108A-108N is used for estimating RSSI between two Wi-Fi access points of plurality of nearby Wi-Fi access points 102A-102N to client device 108A, using measurement collection module 208.

Once the RF measurements are collected by measurement collection module 208, cloud platform 106 employs an Artificial Intelligence (AI) model 210 to derive interference measurements based on the RF measurements collected from plurality of nearby Wi-Fi access points 102A-102N.

Cloud platform 106 then utilizes AI model 210 to derive configurations related to one or more Wi-Fi network parameters associated with connected Wi-Fi access point 102A based on the RF measurements and the interference measurements.

AI model 210 utilizes the RF measurements and the interference measurements to maximize overall performance of the Wi-Fi network by solving a complex optimization problem with variables that are easily measured. The architecture considers plurality of nearby Wi-Fi access points 102A-102N and historical measurements to determine a channel update frequency and decision-making variables.

The maximization of Eq. 1 delivers the optimal transmission for Wi-Fi access point 102A to maximize the data rate delivery to a corresponding client device 108A of plurality of client devices 108A-108N, without taking $RSSI_{AP-AP}$ into account explicitly. Cloud platform 106 has the capability to estimate $RSSI_{AP-AP}$ from available measurements and obtains a superiority over channel assignment. Thus, Eq. 1 transforms to Eq. 3 as follows, $$SINR_{Total} = \frac{RSSI_{i,STA}}{\sum_{j=1}^{N} C \cdot RSSI_{j,STA}} + \frac{RSSI_{i,AP}}{\sum_{j=1}^{M} C \cdot RSSI_{j,AP}} \quad (3)$$

where $RSSI_{STA}$ and $RSSI_{AP}$ are the signal powers of STA and AP respectively; N is the number of Wi-Fi access points whose signal reaches STA; M is the number of Wi-Fi access points whose signal reaches a particular Wi-Fi access point. Eq. 3 provides optimal transmission channel to maximize the data rate in both directions. The second term in the right-hand side of the equation covers the impact of the AP scan and AP based channel assignment. Using Eq. 3, both AP and STA transmit under minimum interference.

In accordance with an embodiment, AI model 210 in cloud platform 106 detects one or more Wi-Fi capable devices in the Wi-Fi network based on the RF measurements and the interference measurements. A Wi-Fi capable device is proximate to one or more client devices of plurality of client devices 108A-108N and plurality of nearby Wi-Fi access points 102A-102N. A Wi-Fi capable device can be, but need not be limited to, a printer, an IoT device and an extender. The one or more Wi-Fi capable devices are detected by performing a Wi-Fi scan and ping to identify a MAC address in respect of each Wi-Fi capable device. For example, a ping module regularly scans the connected networks and reports the network neighbors. Further cloud platform 106 constantly searches for common MAC addresses from the Wi-Fi scans and pings.

Thereafter, the interference measurements from the one or more Wi-Fi capable devices are not considered by AI model 210 while deriving the configurations for the one or more network parameters associated with Wi-Fi access point 102A. The process of detecting the one or more Wi-Fi capable devices is further explained in detail as follows.

A typical criterion in the wireless communication is the signal quality which is the ratio of the primary signal power and the interfering signal powers on the same transmission channel. Consider the following equation, $$SINR_{STA} = \frac{RSSI_i}{\sum_{j=1}^{N} C \cdot RSSI_j} \quad (4)$$

where $RSSI_i$ is the received signal strength indicator from $i^{th}$ AP to a particular STA; $RSSI_j$ is the received signal strength indicator from $j^{th}$ AP; C is the interference coefficient as a function of transmission channels; $SINR_{STA}$ is the signal to interference plus noise ratio for a particular STA. A higher SINR results in a higher-level modulation which in turn provides a higher data rate delivery per time. Eq. 4 is utilized in the optimization formulation to obtain Eq. 5 as follows, $$\underset{CH}{\text{Max}} = \frac{RSSI_{i,STA}}{\sum_{j=1}^{N} C \cdot RSSI_{j,STA}} \quad (5)$$

$$CH \in 1, 2, \ldots, 11$$

where $RSSI_{STA}$ and $RSSI_{AP}$ are the signal powers STA and AP receive respectively; N is the number of APs whose signal reaches STA; M is the number of APs whose signal reaches a particular AP; CH is the transmission channel of the AP.

A major problem while solving Eq. 5 is the presence of Wi-Fi capable devices which broadcast beacon signals. These devices are considered as external Wi-Fi access points due to their nature. In addition, these devices always share the same channel with the Wi-Fi access point to which they are connected. Thus, the SDN tries to change the channel of the primary Wi-Fi access point. Once Eq. 5 is solved, the interference from the Wi-Fi capable devices results in frequent channel change policies although the devices do not cause interference, since Wi-Fi capable devices usually have high RSSI at the same channel. Therefore, Eq. 5 transforms to, $$\underset{CH}{\text{Max}} = \frac{RSSI_{i,STA}}{\sum_{j=1}^{N} \delta(j) \cdot C \cdot RSSI_{j,STA}} \quad (6)$$

$$CH \in 1, 2, \ldots, 11$$

where $\delta(j)$ is the delta function and T is returned if the device is a Wi-Fi access point, else '0' is returned. Thus, only Wi-Fi access points contribute to the interference, and are used in the calculations by AI model 210, although Wi-Fi capable devices broadcast beacons.

Thereafter, cloud platform 106 updates the one or more Wi-Fi network parameters associated with connected Wi-Fi access point 102A using an update module 212 based on the derived configurations from AI model 210. In an instance, update module 212 updates a channel of connected Wi-Fi access point 102A.

Further, cloud platform 106 includes an application module 214 via which an application can be downloaded on different mobile operating system platforms to provide the aforementioned functionalities. Application module 214 is further described in detail in conjunction with FIG. 3.

In an embodiment, cloud platform 106 utilizes AI model 210 in cloud platform 106 for calculating a number of clusters/rooms in a household based on the RF measurements and the interference measurements received from plurality of client devices 108A-108N, using a calculation module 216.

Calculation module 216 utilizes RF measurements from plurality of client devices 108A-108N in the unlicensed spectrum to calculate the number of clusters/rooms within a household for practical SDN applications.

Calculation model 216 calculates the number of clusters/rooms in the household through iterations. The number of clusters/rooms is then used as an input parameter in unsupervised learning/clustering algorithms of AI model 210 to determine an average distance of individual measurements from plurality of client devices 108A-108N in the clusters/rooms using inter-cluster statistical analysis.

Further, calculation module 216 determines if the average distance exceeds a pre-defined threshold and in response to determining the average distance exceeds the pre-defined threshold, the number of clusters/rooms is increased to reduce the average distance within the clusters/rooms.

Figure 4:
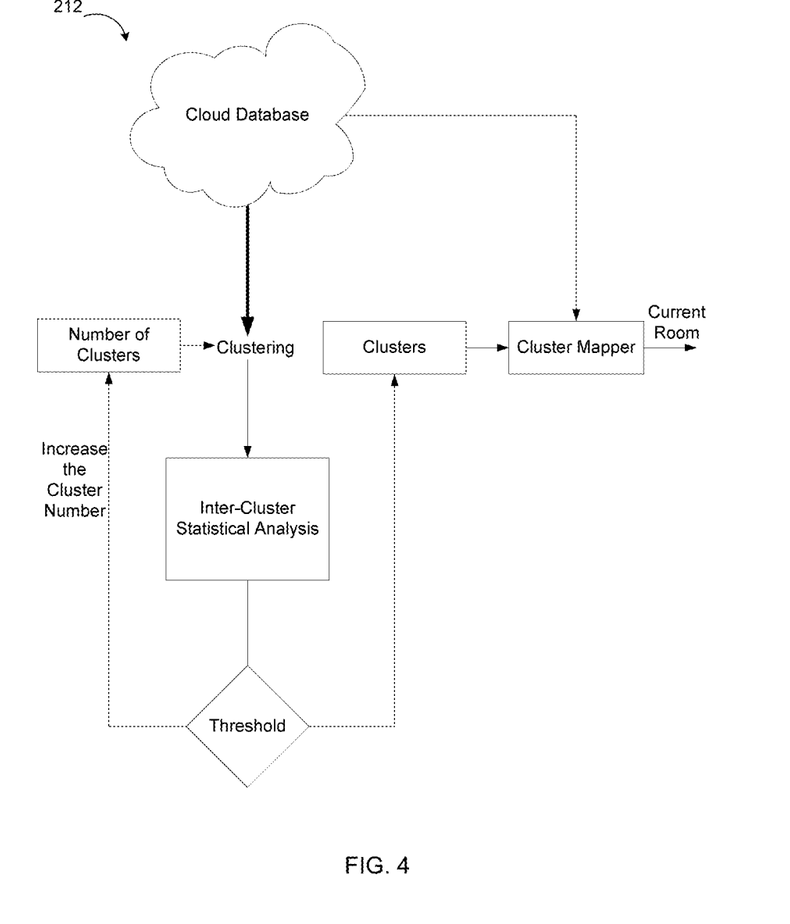
FIG. 4 illustrates an overall algorithm of a calculation module for calculating number of clusters/rooms in a household using RSSI and MAC address measurements as time series in accordance with an embodiment of the invention.

The overall algorithm of calculation module 216 is further described in detail in conjunction with FIG. 4.

Furthermore, AI model 210 assigns a frequency band of a plurality of frequency bands to each client device in a cluster/room. The frequency band is assigned to a client device based on a capacity/bandwidth and a range of the frequency band. For instance, 2.4 GHz has 50 m range but in total less bandwidth, 5 GHz has 20 m range and has more bandwidth, and 6 GHz has 5 m range and the highest bandwidth. Accordingly, depending on the clusters/rooms, AI model 210 assigns a client device that requires a high bandwidth to 6 GHz, and the others to 5 GHz.

Figure 3:
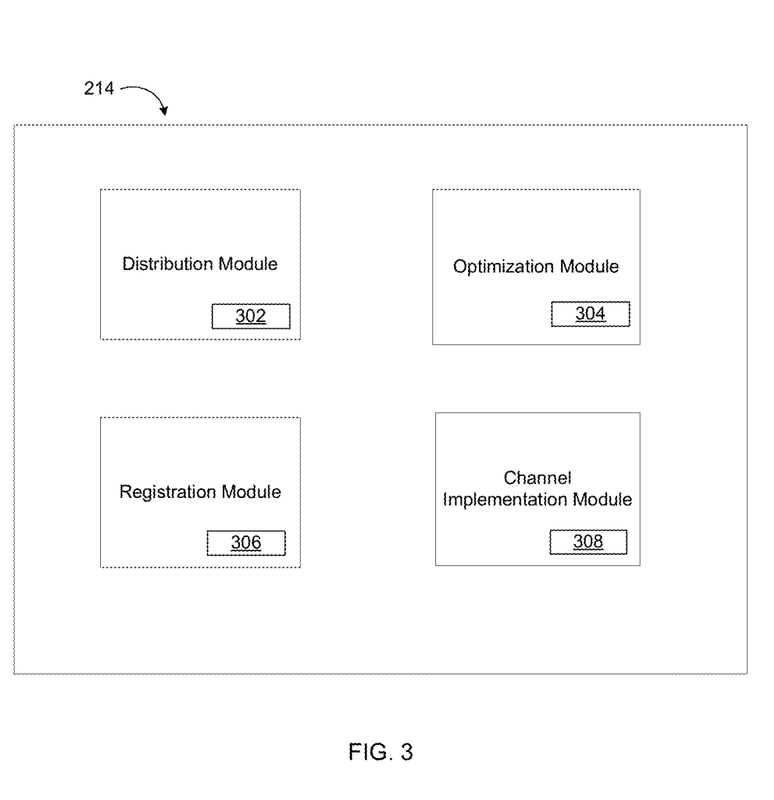
FIG. 3 illustrates various modules within an application module for enhancing signal qualities within the Wi-Fi network in accordance with an embodiment of the invention.

FIG. 3 illustrates various modules within application module 214 for enhancing signal qualities within the Wi-Fi network in accordance with an embodiment of the invention.

As illustrated in FIG. 3, application module 214 includes a distribution module 302 which displays plurality of nearby Wi-Fi access points 102A-102N on a map integrated user interface (UI). Distribution module 302 then distributes plurality of nearby Wi-Fi access points 102A-102N, so that there is no conflict on the map and Wi-Fi access points with the strongest RSSIs are closer to a client device 108A among plurality of client devices 108A-108N. Further, distribution module 302 updates the positions of plurality of nearby Wi-Fi access points 102A-102N, once their actual positions change or more measurements are obtained for a better positioning. Further, a user can swipe to other regions on the map to do tests on the other regions.

Application module 214 further includes an optimization module 304 which enables the user to calculate the optimal transmission for a set of Wi-Fi access points of plurality of nearby Wi-Fi access points 102A-102N, by clicking on a marker on the UI. The more Wi-Fi access points are clicked, the more decision variables are included in the optimization and overall contribution of the optimization increases. However, the channel is changed only if plurality of nearby Wi-Fi access points 102A-102N are registered.

Accordingly, application module 214 includes a registration module 306 for registering plurality of nearby Wi-Fi access points 102A-102N to enable the user to calculate the optimal transmission channel for plurality of nearby Wi-Fi access points 102A-102N. In an embodiment, the registration process includes a login for submitting a Wi-Fi access point model and user credentials for registering the Wi-Fi access point. Once the credentials are submitted for the Wi-Fi access point, a channel implementation module 308 changes the channels automatically based on the policies for channel management.

Channel implementation module 308 runs in the background and changes the channels when a client device 108A of plurality of client devices 108A-108N is connected to Wi-Fi access point 102A. Also, channel implementation module 308 is flexible to any brand of Wi-Fi access point and does not rely on a specific vendor for implementation purposes.

Various use cases of application module 214 are further described in detail in conjunction with FIGS. 5A-5E.

FIG. 4 illustrates an overall algorithm of calculation module 216 for calculating number of clusters/rooms in a household using RSSI and MAC address measurements as time series in accordance with an embodiment of the invention.

As illustrated in FIG. 4, calculation module 216 utilizes unsupervised learning algorithms which receive number of clusters/rooms as an input parameter. In this case, the number of clusters/rooms is determined through iterations. Initially, the entire set of data is considered a cluster. The average distance of individual measurements based on inter-cluster statistical analysis is calculated from:

$$averagedistance = \frac{\sum_{i=1}^{N} D(M_i, C_j)}{N} \quad (7)$$

where N is the number of measurements within the cluster; $M_i$ is the $i^{th}$ measurement; $C_j$ is the center of $j^{th}$ cluster.

Once the average distance exceeds a pre-defined threshold, the number of clusters/rooms is increased to reduce the average distance within the clusters. Further, the clusters/rooms may be described by any mathematical function (for example, convex hull) and a new measurement can easily be mapped to a cluster to determine the position online.

FIGS. 5A-5E illustrate various use cases of application module 214 on a simplified floor plan in accordance with various embodiments of the invention.

Figure 5A:
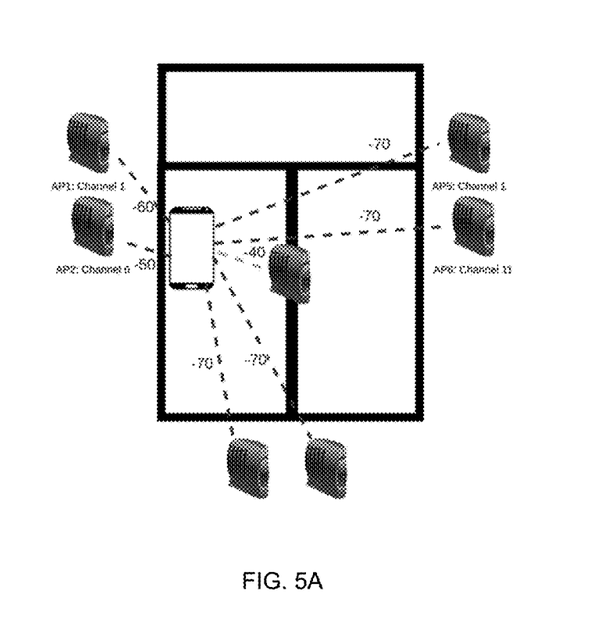
FIGS. 5A-5E illustrate various use cases of the application module on a simplified floor plan in accordance with an embodiment of the invention.

FIG. 5A demonstrates a client device (STA) interfered by nearby Wi-Fi access points (APs). The numbers on the dashed lines are the RSSIs which the STA obtains. For the case in FIG. 5A, the STA is on the left and exposed to interference from $AP_1$ and $AP_2$ whose channels are 1 and 6, respectively. The algorithm of AI model 210 sets the connected AP channel to 11. Both $AP_3$ and $AP_6$ cause interference to the STA. However, the limited resources of unlicensed spectrum do not allow STA to have an interference-free connection. Thus, the optimization provides the minimum interference available.

Figure 5B:
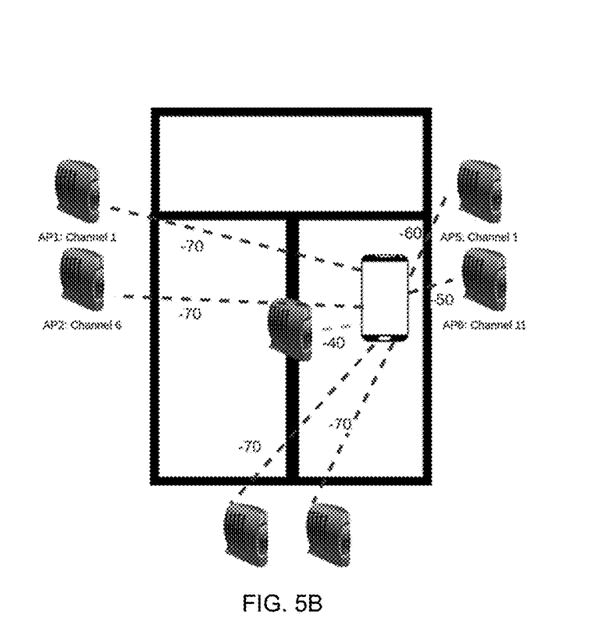

The mobility of the STA causes the need to change the channel to maximize the signal quality. FIG. 5B demonstrates such a case where a channel update is necessary since the STA moves to the other room. The STA suffers from the interference by $AP_5$ and $AP_6$, in this case. The algorithm of AI model 210 updates the connected AP channel to 6.

Figure 5C:
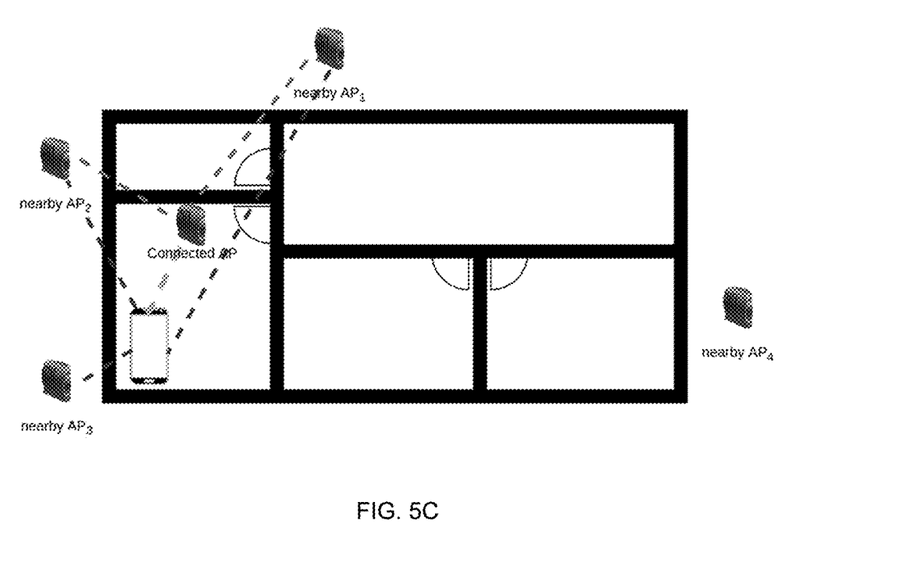

FIG. 5C represents a typical floor plan which includes only one STA and nearby APs. In this case, it is assumed there is only one station and one measurement. The dashed lines represent the signals reaching the STA from nearby APs and signals which reach the connected AP from nearby APs. In practice, the data delivery is highly driven by the signal quality. On the other hand, the STA suffers from low Wi-Fi quality once the $AP_3$ channel overlaps with the connected AP. Thus, user centric optimization, as shown in Eq. 3, maximizes the probability of data delivery when $AP_3$ transmits. Once the user centric calculations are ignored, the transmission from the connected AP fails and causes retransmission of the packets, which significantly reduces Wi-Fi performance. Thus, optimal channels cannot be assigned by scanning nearby APs only and the STA measurements make a great contribution to the decision making in application module 214.

Figure 5D:
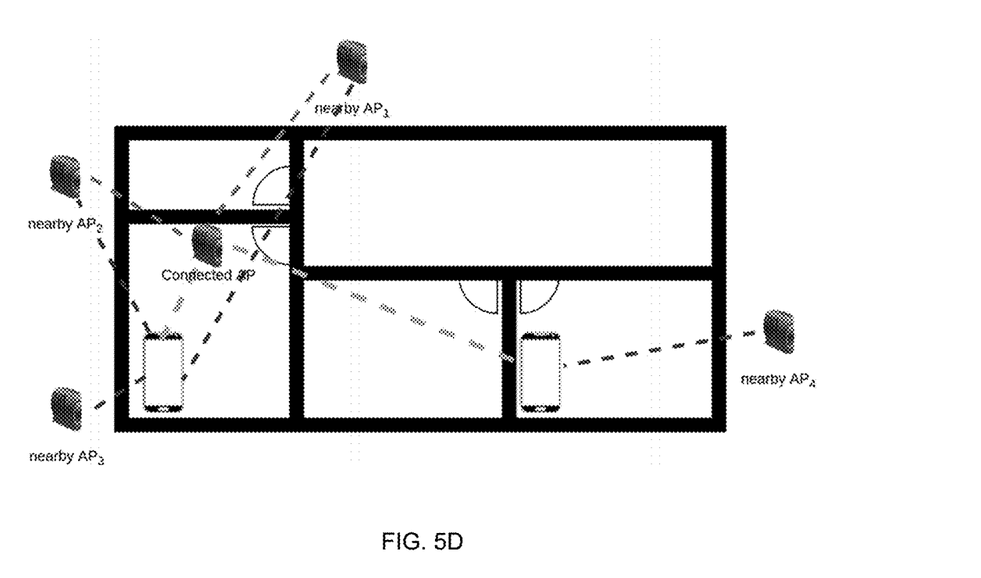

FIG. 5D illustrates a floor plan with 2 STAs and nearby APs. Unlike $STA_1$, $STA_2$ suffers from the interference from $AP_4$. Thus, to provide the maximum Wi-Fi performance, the channel of connected AP should be determined using measurement of both $STA_1$ and $STA_2$, since the connected AP and the connected STAs use the same channel, Eq. 3 transforms to:

$$SINR_{Total} = \frac{RSSI_{i,STA1}}{\sum_{j=1}^{N} C \cdot RSSI_{j,STA1}} + \frac{RSSI_{i,STA2}}{\sum_{j=1}^{K} C \cdot RSSI_{j,STA2}} + \frac{RSSI_{i,AP}}{\sum_{j=1}^{M} C \cdot RSSI_{j,AP}} \quad (8)$$

where K is the number of nearby APs whose signals reach $STA_2$.

Application module 214 has the capability to weight the network elements in Eq. 8. For instance, more weight can be implemented on $STA_2$, to maximize its connection quality. By default, application module 214 makes decisions to increase the overall network performance.

Figure 5E:
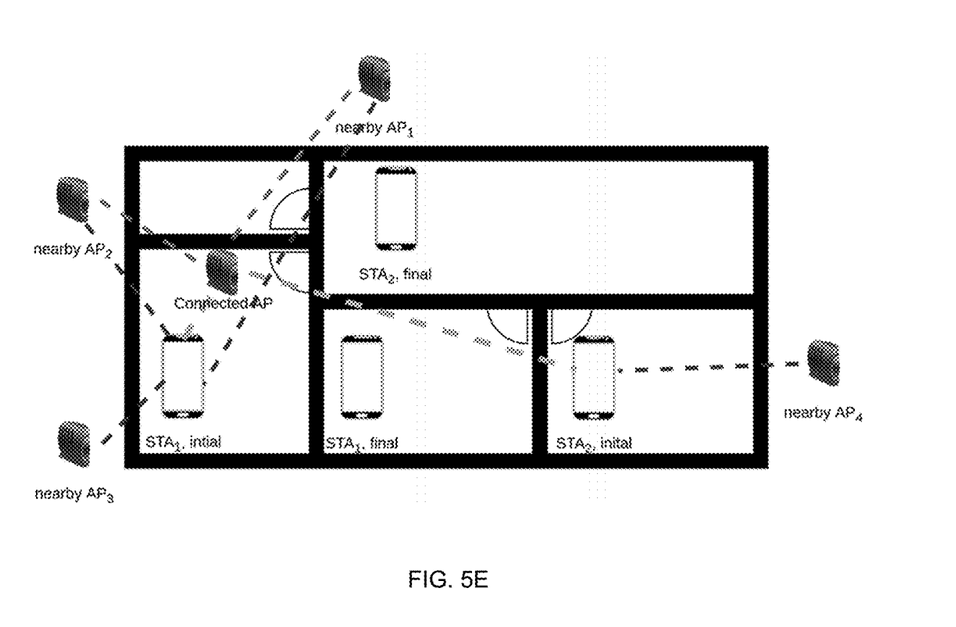

FIG. 5E illustrates a floor plan with high number of STAs with historical measurements and nearby APs.

Application module 214 utilizes the mobility information of STAs. In practice, the quality of the signal and the interference changes significantly even within a household, influencing the Wi-Fi performance. FIG. 5E shows a typical demonstration of STA mobility and its impact on interference. For instance, when $STA_{2,\ initial}$ changes its position to $STA_{2,\ final}$, the interference $STA_2$ is exposed to changes. $STA_2$ might suffer interference from $AP_1$ instead of AP4. Thus, depending on the channels and the signal powers, application module 214 might change the channel of the connected AP.

Measurement collection module 208 reports the RF environment regularly, which forms a historical profile for both APs and STAs. In turn, the time distribution of connection quality and the interference is monitored. Application module 214 has the capability to make a weighted decision to maximize the signal quality for most time spending regions, while making long horizon decisions.

Furthermore, high mobility of the STAs might require frequent changes in the channel, which might cause instantaneous disconnection. Application module 214 can limit and modify the channel update frequency based on several considerations. One option is to update the channels during the nights when the usage is lower. Application module 214 also tracks the number of users within the network and does the update when the number of users is relatively low. On the other hand, application module 214 calculates the contribution of channel update to overall Wi-Fi network and implements the update only if there is a significant contribution.

Figure 6:
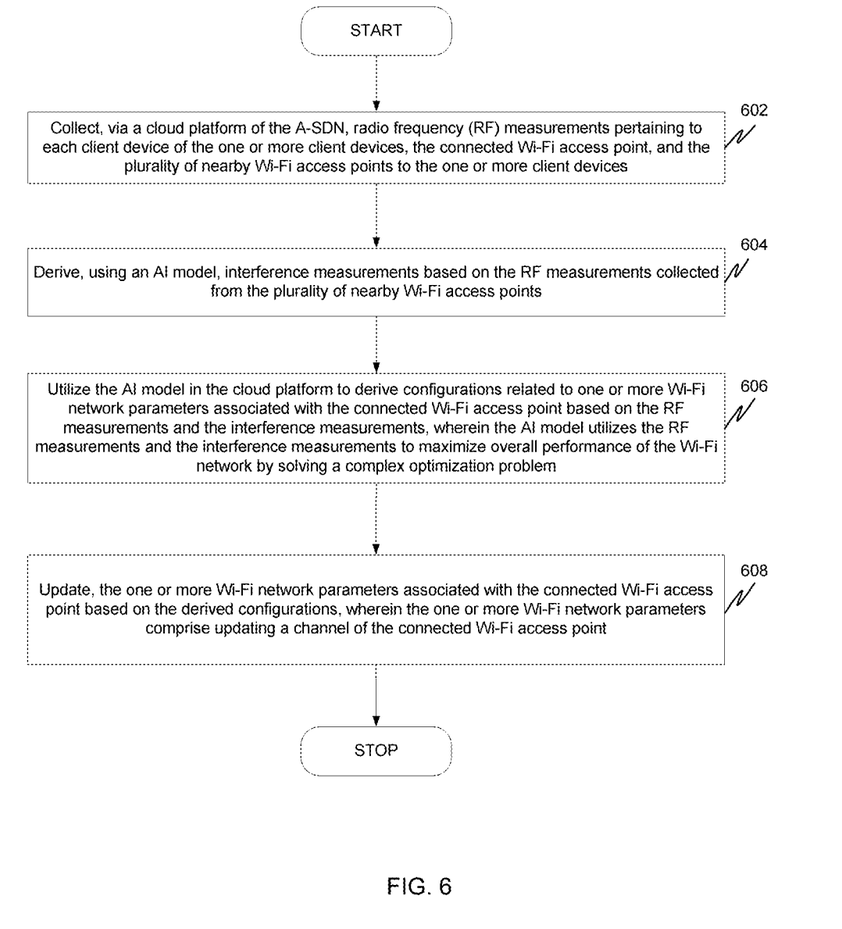
FIG. 6 illustrates a flowchart of a method for enhancing signal qualities within the Wi-Fi network using an A-SDN in accordance with an embodiment of the invention.

FIG. 6 illustrates a flowchart of a method for enhancing signal qualities within the Wi-Fi network using A-SDN 104 and cloud platform 106 in accordance with an embodiment of the invention.

An infrastructure management function of A-SDN 104 further comprises Spectrum Broker (SB) function which is configured to obtain, optimize and automate spectrum resources. The SB function can be extended to Low Power Wide Area Networks (LPWANs) that use sub-GHz radio frequencies (typically 433 or 868 MHz) with typical transmission ranges in the order of 1 up to 50 kilometers. Notorious initiatives in this domain include, but are not limited to, Long Range (LoRa), Sigfox and the upcoming IEEE 802.11ah (or "HaLow") standard or NarrowBand-Internet of Things (NB-IoT) and 5G massive machine-type communications (mMTC). The SB function considers signal strengths and application specific parameters to manage the spectrum.

To start with, at step 602, measurement collection module 208 collects RF measurements pertaining to each client device of the one or more client devices, connected Wi-Fi access point 102A, and plurality of nearby Wi-Fi access points 102A-102N to the one or more client devices.

Subsequently, at step 604, AI model 210 is used to derive interference measurements based on the RF measurements collected from plurality of nearby Wi-Fi access points 102A-102N.

At step 606, AI model 210 derives configurations related to one or more Wi-Fi network parameters associated with connected Wi-Fi access point 102A based on the RF measurements and the interference measurements. The one or more Wi-Fi network parameters can be, but need not be limited to, a channel of connected Wi-Fi access point 102A.

AI model 210 then utilizes the RF measurements and the interference measurements to maximize overall performance of the Wi-Fi network by solving a complex optimization problem. In an embodiment, AI model 210 detects one or more Wi-Fi capable devices in the Wi-Fi network based on the RF measurements and the interference measurements, to negate the interference measurements from the one or more Wi-Fi capable devices while deriving configurations related to the one or more Wi-Fi network parameters. The one or more Wi-Fi capable devices can be, but need not be limited to, a printer, an IoT device and an extender.

AI model 210 detects the one or more Wi-Fi capable devices by performing a Wi-Fi scan and ping to identify MAC addresses in respect of each Wi-Fi capable device. Thus, interference measurements from the one or more Wi-Fi capable devices are not considered by AI model 210 while deriving configurations.

Thereafter, at step 608, the one or more Wi-Fi network parameters associated with connected Wi-Fi access point 102A are updated based on the derived configurations. In an instance, a channel of connected Wi-Fi access point 102A is updated based on the derived configurations.

Further, AI model 210 calculates the number of clusters/rooms in a household through iterations. The number of clusters/rooms is then used as an input parameter in unsupervised learning/clustering algorithms of AI model 210 to determine an average distance of individual measurements from client devices in the clusters/rooms using inter-cluster statistical analysis. Thereafter, an average distance is determined and in response to determining that the average distance exceeds a pre-defined threshold, the number of clusters/rooms is increased to reduce the average distance within the clusters/rooms. Also, a frequency band of a plurality of frequency bands is assigned to each client device in a cluster/room, based on a capacity/bandwidth and a range of the frequency band.

The present invention is advantageous as it involves no implementation cost other than installing an application on Wi-Fi access points or client devices, which maximizes signal qualities within a Wi-Fi network to provide higher throughput. Further, the invention is vendor independent and is applicable to various types and versions of Wi-Fi capable devices. The invention also provides effective and focused decisions automatically by additionally considering centralized decisions and historical network measurements.

Further, the invention may be used for industrial considerations such as room residence time distribution and Internet Service Provider (ISP) quality increase. The invention performs room residence time distribution by determining changes in network topology. Alternatively, frequent changes in network topology have computational and real-life experience challenges. Also, the invention measures distribution of time spending at different rooms, which allows the SDN to make weighted average decisions when the control actions are limited.

Furthermore, the invention provides an effective mechanism that will mediate and optimize the contention that the 6 GHz bandwidth causes between 5G and Wi-Fi for channel access.

Additionally, the invention effectively addresses issues related to customer experience regarding poor signal strength and Wi-Fi connectivity. By evaluating information related to location and network usage patterns, the invention allows ISPs to have a better understanding of Wi-Fi connectivity problems and suggest optimal router position and settings to customers.

Furthermore, the proposed approach of the invention integrates several additional network layers and applications for integration of one or more client devices and Wi-Fi access points. The network statistics are monitored for enabling the implementation of self-organized focused decisions and cost-effective implementation of the real-time decisions on the network.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for enhancing signal qualities/performance within a Wi-Fi network using an adaptive software-defined network (A-SDN), the Wi-Fi network including at least one client device connected to a Wi-Fi access point and a plurality of nearby Wi-Fi access points to the at least one client device, the method comprising:
    collecting, via a cloud platform of the A-SDN, radio frequency (RF) measurements pertaining to each client device of the at least one client device, the connected Wi-Fi access point, and the plurality of nearby Wi-Fi access points to the at least one client device;
    deriving, using an AI model, interference measurements based on the RF measurements collected from the plurality of nearby Wi-Fi access points;
    utilizing the AI model in the cloud platform to derive configurations related to at least one Wi-Fi network parameter associated with the connected Wi-Fi access point based on the RF measurements and the interference measurements, wherein the AI model utilizes the RF measurements and the interference measurements to maximize overall performance of the Wi-Fi network by solving a complex optimization problem; and
    updating, by one or more processors, the at least one Wi-Fi network parameter associated with the connected Wi-Fi access point based on the derived configurations, wherein updating at least one Wi-Fi network parameter comprises updating a channel of the connected Wi-Fi access point.

2. The method of claim 1, wherein the RF measurements pertaining to a client device is used for estimating Received Signal Strength Indicator (RSSI) between two Wi-Fi access points of the plurality of nearby Wi-Fi access points to the client device.

3. The method of claim 1, wherein the deriving configurations comprises utilizing the AI model in the cloud platform for detecting at least one Wi-Fi capable device in the Wi-Fi network based on the RF measurements and the interference measurements, wherein a Wi-Fi capable device is proximate to the at least one client and the plurality of nearby Wi-Fi access points.

4. The method of claim 3, wherein a Wi-Fi capable device is one of a printer, an Internet of Things (IoT) device and an extender.

5. The method of claim 3, wherein the detecting comprises performing a Wi-Fi scan and ping to identify MAC addresses in respect of each Wi-Fi capable device, wherein interference measurements from the at least one Wi-Fi capable device are not considered by the AI model while deriving configurations.

6. The method of claim 1 further comprises utilizing the AI model in the cloud platform for calculating a number of clusters/rooms in a household based on the RF measurements and the interference measurements received from a plurality of client devices.

7. The method of claim 6, wherein the AI model calculates the number of clusters/rooms in the household through iterations, wherein the number of clusters/rooms is then used as an input parameter in unsupervised learning/clustering algorithms of the AI model to determine an average distance of individual measurements from client devices in the clusters/rooms using inter-cluster statistical analysis.

8. The method of claim 7 further comprises determining if the average distance exceeds a pre-defined threshold and in response to determining the average distance exceeds the pre-defined threshold, increasing the number of clusters/rooms to reduce the average distance within the clusters/rooms.

9. The method of claim 8 further comprises, assigning, by one or more processors, to each client device in a cluster/room, a frequency band of a plurality of frequency bands, wherein the frequency band is assigned based on a capacity/bandwidth and a range of the frequency band.

10. A system for enhancing signal qualities/performance within a Wi-Fi network using an adaptive software-defined network (A-SDN), the Wi-Fi network including at least one client device connected to a Wi-Fi access point and a plurality of nearby Wi-Fi access points to the at least one client device, the system comprising:
    a memory;
    a processor communicatively coupled to the memory, wherein the processor is configured to:
        collect, via a cloud platform of the A-SDN, radio frequency (RF) measurements pertaining to each client device of the at least one client device, the connected Wi-Fi access point, and the plurality of nearby Wi-Fi access points to the at least one client device;
        derive, using an AI model, interference measurements based on the RF measurements collected from the plurality of nearby Wi-Fi access points;
        utilize the AI model in the cloud platform to derive configurations related to at least one Wi-Fi network parameter associated with the connected Wi-Fi access point based on the RF measurements and the interference measurements, wherein the AI model utilizes the RF measurements and the interference measurements to maximize overall performance of the Wi-Fi network by solving a complex optimization problem; and update, the at least one Wi-Fi network parameter associated with the connected Wi-Fi access point based on the derived configurations, wherein updating the at least one Wi-Fi network parameter comprises updating a channel of the connected Wi-Fi access point.

11. The system of claim 10, wherein the RF measurements pertaining to a client device is used for estimating Received Signal Strength Indicator (RSSI) between two Wi-Fi access points of the plurality of nearby Wi-Fi access points to the client device.

12. The system of claim 10, wherein the processor is configured to utilize the AI model in the cloud platform for detecting at least one Wi-Fi capable device in the Wi-Fi network based on the RF measurements and the interference measurements, wherein a Wi-Fi capable device is proximate to the at least one client and the plurality of nearby Wi-Fi access points.

13. The system of claim 12, wherein a Wi-Fi capable device is one of a printer, an Internet of Things (IoT) device and an extender.

14. The system of claim 12, wherein the processor is configured to perform a Wi-Fi scan and ping to identify MAC addresses in respect of each Wi-Fi capable device, wherein interference measurements from the at least one Wi-Fi capable device are not considered by the AI model while deriving configurations.

15. The system of claim 10, wherein the processor is further configured to utilize the AI model in the cloud platform for calculating a number of clusters/rooms in a household based on the RF measurements and the interference measurements received from a plurality of client devices.

16. The system of claim 15, wherein the AI model calculates the number of clusters/rooms in the household through iterations, wherein the number of clusters/rooms is then used as an input parameter in unsupervised learning/clustering algorithms of the AI model to determine an average distance of individual measurements from client devices in the clusters/rooms using inter-cluster statistical analysis.

17. The system of claim 16, wherein the processor is further configured to determine if the average distance exceeds a pre-defined threshold and in response to determining the average distance exceeds the pre-defined threshold, increasing the number of clusters/rooms to reduce the average distance within the clusters/rooms.

18. The system of claim 17, wherein the processor is further configured to assign to each client device in a cluster/room, a frequency band of a plurality of frequency bands, wherein the frequency band is assigned based on a capacity/bandwidth and a range of the frequency band.

* * * * *